(12) United States Patent
Tsao et al.

(10) Patent No.: US 7,852,422 B2
(45) Date of Patent: Dec. 14, 2010

(54) THIN FILM TRANSISTOR ARRAY SUBSTRATE AND PIXEL STRUCTURE WITH TFT HAVING VARYING INCLUDED ANGLE OF CHANNEL LAYER

(75) Inventors: Cheng-Han Tsao, Hsinchu (TW); Yi-Pai Huang, Hsinchu (TW); Ting-Jui Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 154 days.

(21) Appl. No.: 11/739,116

(22) Filed: Apr. 24, 2007

(65) Prior Publication Data

US 2008/0143900 A1    Jun. 19, 2008

(30) Foreign Application Priority Data

Dec. 15, 2006    (TW) .............................. 95147039 A

(51) Int. Cl.
*G02F 1/136* (2006.01)

(52) U.S. Cl. ........................................ 349/48; 349/43
(58) Field of Classification Search ............. 349/42–48, 349/54; 257/59, 72
See application file for complete search history.

(56) References Cited

U.S. PATENT DOCUMENTS

| 5,610,739 | A | 3/1997 | Uno et al. |
| 6,492,847 | B1 | 12/2002 | Goetz et al. |
| 6,495,858 | B1 * | 12/2002 | Zhang .......................... 257/59 |
| 2005/0030460 | A1 * | 2/2005 | Kim et al. .................... 349/139 |
| 2005/0162579 | A1 * | 7/2005 | Jeong et al. ................... 349/43 |
| 2006/0158576 | A1 | 7/2006 | Kim et al. |
| 2007/0236625 | A1 * | 10/2007 | Wang et al. ................... 349/54 |

FOREIGN PATENT DOCUMENTS

| CN | 1693979 | 11/2005 |
| JP | 05232512 A * | 9/1993 |

OTHER PUBLICATIONS

Nishikawa, Ryuji, Machine Translation of JPO Unexamined Patent Application Publication 05-232512 A.*

* cited by examiner

*Primary Examiner*—Mark A Robinson
*Assistant Examiner*—Michael Inadomi
(74) *Attorney, Agent, or Firm*—Jianq Chyun IP Office

(57) ABSTRACT

A thin film transistor (TFT) array substrate including a substrate, scan lines and data lines both disposed on the substrate, and pixel structures is provided. A plurality of pixel areas is defined by the scan lines and the data lines on the substrate. Each scan line has a driving signal input terminal and an end terminal. Each pixel area includes a first sub-pixel area and a second sub-pixel area. The pixel structures are respectively disposed in the pixel areas and driven by the scan lines and the data lines. Each pixel structure in the respective pixel area includes a first TFT corresponding to the first sub-pixel area and a second TFT corresponding to the second sub-pixel area. Besides, ratios of a channel width to a channel length of the second TFTs connected to the same scan line increase gradually from the driving signal input terminal to the end terminal.

6 Claims, 6 Drawing Sheets

THIN FILM TRANSISTOR ARRAY SUBSTRATE AND PIXEL STRUCTURE WITH TFT HAVING VARYING INCLUDED ANGLE OF CHANNEL LAYER

CROSS-REFERENCE TO RELATED APPLICATION

This application claims the priority benefit of Taiwan application serial no. 95147039, filed Dec. 15, 2006. All disclosure of the Taiwan application is incorporated herein by reference.

BACKGROUND OF THE INVENTION

1. Field of the Invention

The present invention relates to an active device array substrate, and more particularly to a thin film transistor (TFT) array substrate of a liquid crystal display (LCD) panel and a pixel structure thereof.

2. Description of Related Art

With the continuous advancement of larger-sized LCDs, the demand for progress and breakthroughs in wide-viewing-angle technology are growing to resolve the problem of viewing-angle resulted from larger display size. A multi-domain vertical alignment (MVA) LCD panel is one of the common LCDs utilizing wide viewing angle technology.

Generally speaking, the MVA LCD panel adopts a design of an alignment structure, such that the liquid crystal layer in the same pixel area is divided into various sections. Liquid crystal molecules in different sections are arranged in different directions, and thus such an LCD panel has a wider viewing angle. Due to the optical properties of the liquid crystal molecules, however, the conventional MVA LCD panel encounters difficulties of color distortion or insufficient color saturation when viewing an image from different viewing angles. This is the so-called "color washout". To conquer said difficulties, a method for creating more domains in a pixel area has been proposed upon the improvement of the driving principles and the pixel design. The method is mainly performed by configuring another set of devices such as TFTs and pixel electrodes to compensate color distortion and insufficient color saturation. FIG. 1A depicts a design of the aforementioned pixel structure, and a brief introduction thereof is provided hereinafter.

As indicated in FIG. 1A, a pixel structure 120 is, for example, driven by a scan line 112 and a data line 114. A first TFT 130, a first liquid crystal capacitor Clc1, a first storage capacitor Cst1, a second TFT 140, a second liquid crystal capacitor Clc2, a second storage capacitor Cst2, and a coupling capacitor Cx are included in the pixel structure 120. It should be noted that the liquid crystal capacitors of the present invention refer to a capacitor structure constructed by a liquid crystal layer and electrodes disposed on the upper and lower sides of the liquid crystal layer. The first liquid crystal capacitor Clc1 and the first storage capacitor Cst1 are connected to the first TFT 130 so as to write a display voltage under the control of the first TFT 130. The second liquid crystal capacitor Clc2 and the second storage capacitor Cst2 are connected to the second TFT 140. The coupling capacitor Cx and the second TFT 140 jointly manipulate the written-in display voltage, leading to a different display voltage written in the first liquid crystal capacitor Clc1 and the first storage capacitor Cst1 from that into the second liquid crystal capacitor Clc2 and the second storage capacitor Cst2. Thereby, color distortion and insufficient color saturation are compensated.

However, as the LCD panel gets larger in size, a resistance-capacitance delay (RC delay) among the electronic devices of the LCD panel occurs more often. Particularly, since the second TFTs are additionally disposed in the single pixel area, the RC delay in said pixel structure is threatening. In more details, the second TFT far away from the driving terminal on the same scan line faces the problem of insufficient charging/discharging capacity on account of the RC delay. Thereby, the second liquid crystal capacitor Clc2 and the second storage capacitor Cst2 may function abnormally, and the display quality is then affected. The results of actual measurement are elaborated as follows.

FIG. 1B is a gamma curve depicting a conventional MVA LCD having the pixel structure 120. In FIG. 1B, curves 150, 160 and 170 respectively denote the gamma curves in the left section, the center section, and the right section of the LCD exhibiting images at a wide viewing angle. In the section where the LCD is close to the driving signal input terminal (i.e. in the left section), the charging time of the TFT is relatively sufficient. Accordingly, as shown in FIG. 1B, when the LCD in a medium gray scale state is displaying images at the wide viewing angle, the light transmittance rate in the left section (the curve 150) of the LCD is apparently higher than that in the center section and in the right section (the curves 160 and 170). Thereby, mura defects of the LCD panel occur when images are viewed at the wide viewing angle, leading to color distortion and insufficient color saturation. Accordingly, there is still room for further improvement of the display uniformity of MVA LCD

SUMMARY OF THE INVENTION

The present invention provides a TFT array substrate to reduce an RC delay resulted from enlargement of an LCD panel.

The present invention provides a pixel structure to compensate color distortion and insufficient color saturation at different viewing angles.

The present invention provides a TFT array substrate. The TFT array substrate includes a substrate, a plurality of scan lines, a plurality of data lines and a plurality of pixel structures. The scan lines are disposed on the substrate, and each scan line includes a driving signal input terminal and an end terminal. In addition, the data lines are disposed on the substrate, and a plurality of pixel areas is defined by the scan lines and the data lines on the substrate. Each pixel area includes a first sub-pixel area and a second sub-pixel area. Moreover, the pixel structures are respectively disposed in the pixel areas and are driven by the scan lines and the data lines. Each pixel structure in the respective pixel area includes a first TFT corresponding to the first sub-pixel area and a second TFT corresponding to the second sub-pixel area. A channel width of each second TFT is W and a channel length of the same is L. Ratios W/L of the channel width to the channel length of the second TFTs disposed on the same scan line increase gradually from the driving signal input terminal to the end terminal.

According to one embodiment of the present invention, each of the second TFTs includes a gate, a channel layer, a source and a drain. The channel layer is, for example, disposed on the gate and includes a first section and a second section. The first section and the second section form an included angle θ. In addition, the source and the drain are, for example, disposed on the first section and on the second section of the channel layer, respectively. According to one embodiment of the present invention, a range of the included angle is $90° \leq \theta < 180°$.

Moreover, each aforesaid source and each aforesaid drain cross over the corresponding gate.

On the other hand, according to one embodiment of the present invention, each aforesaid scan line corresponding to the respective pixel includes an opening, and one terminal of the source or one terminal of the drain corresponding to the pixel is located in the opening.

The present invention further provides a pixel structure adapted to be disposed in a pixel area of a display panel, and the pixel area includes a first sub-pixel area and a second sub-pixel area. The pixel structure includes a first TFT corresponding to the first sub-pixel area and a second TFT corresponding to the second sub-pixel area. The second TFT substantially includes a gate, a channel layer, a source and a drain. The channel layer is disposed on the gate and includes a first section and a second section. The first section and the second section form an included angle $\theta$. In addition, the source and the drain are disposed on the first section and on the second section of the channel layer, respectively.

According to one embodiment of the present invention, a range of said included angle is $90°\leq\theta<180°$, for example.

According to one embodiment of the present invention, said source and said drain cross over the corresponding gate, for example.

According to one embodiment of the present invention, said gate includes an opening, and one terminal of the source or one terminal of the drain corresponding to the gate is located in the opening.

According to one embodiment of the present invention, said pixel structure further includes a first liquid crystal capacitor, a second liquid crystal capacitor, and a coupling capacitor. The first liquid crystal capacitor is, for example, disposed in the first sub-pixel area and electrically connected to the first TFT. The second liquid crystal capacitor is, for example, disposed in the second sub-pixel area and electrically connected to the second TFT. In addition, the coupling capacitor is, for example, electrically connected between the corresponding second liquid crystal capacitor and the first TFT.

The present invention provides a TFT array substrate. The TFT array substrate includes a substrate, a plurality of scan lines, a plurality of data lines and a plurality of pixel structures. The scan lines and the data lines are disposed on the substrate, and a plurality of pixel areas is defined by the scan lines and the data lines on the substrate. Each pixel area includes a first sub-pixel area and a second sub-pixel area. Moreover, the pixel structures are respectively disposed in the pixel areas and are driven by the scan lines and the data lines. Each pixel structure in the respective pixel area includes a first TFT corresponding to the first sub-pixel area and a second TFT corresponding to the second sub-pixel area. It should be noted that each second TFT includes a gate, a channel layer, a source and a drain. In the second TFT, the channel layer is disposed on the gate and includes a first section and a second section. The first and the second sections form an included angle $\theta$. In addition, the source and the drain are disposed on the first section and on the second section of the channel layer, respectively.

According to one embodiment of the present invention, a range of said included angle is $90°\leq\theta<180°$, for example.

According to one embodiment of the present invention, said source and said drain cross over the corresponding gate.

According to one embodiment of the present invention, each scan line corresponding to the respective pixel includes an opening, for example, and one terminal of the source or one terminal of the drain corresponding to the pixel is located in the opening.

In the TFT array substrate and the pixel structure of the present invention, the ratios W/L of the channel width to the channel length of the second TFTs on the same scan line increase gradually from the driving signal input terminal to the end terminal. This is conducive to an improvement of the RC delay in each of the second TFTs. Furthermore, the channel layer of each second TFT may be divided to two sections forming an included angle, such that the ratio W/L of the channel width to the channel length can be adjusted without reducing an aperture ratio. To be more specific, the applications of the second TFTs of the present invention to the TFT array substrate and to the pixel structure elevate the display quality.

In order to the make the aforementioned and other objects, features and advantages of the present invention comprehensible, several embodiments accompanied with figures are described in detail below.

DESCRIPTION OF EMBODIMENTS

In general, each TFT on the same scan line in a TFT array substrate is required to achieve the same charging/discharging capacity so as to reduce an RC delay in an LCD panel. Accordingly, the present invention provides a design of a TFT array substrate. Through an alteration in a channel width and a channel length of the TFT, a larger W/L ratio of the TFT far away from a driving signal input terminal and a smaller W/L ratio of the TFT close to the driving signal input terminal can be accomplished. Here, the charging/discharging capacity of each TFT on the same scan line is almost identical.

Figure 1A:
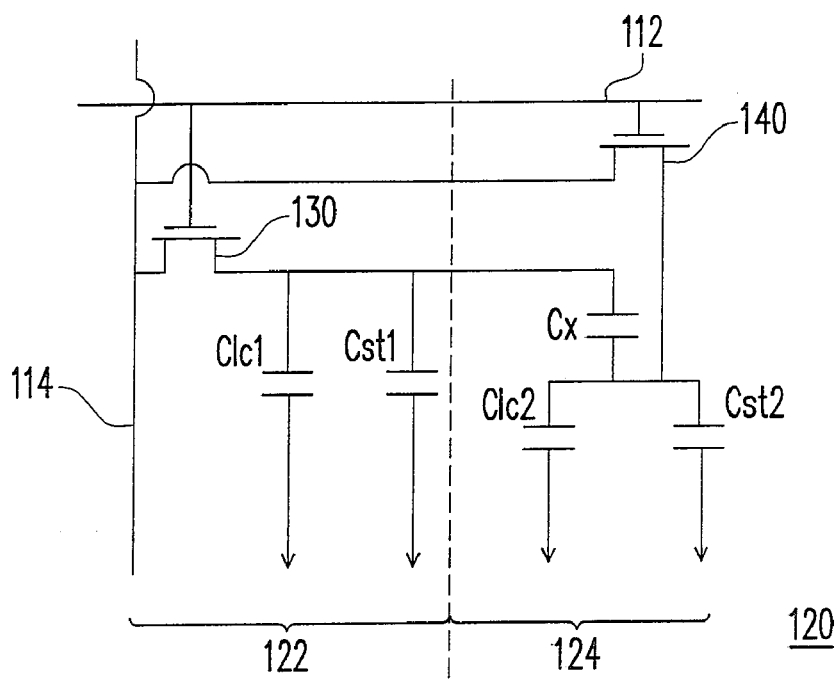
FIG. 1A is a schematic view illustrating a pixel area of an LCD panel having second TFTs.
Figure 1B:
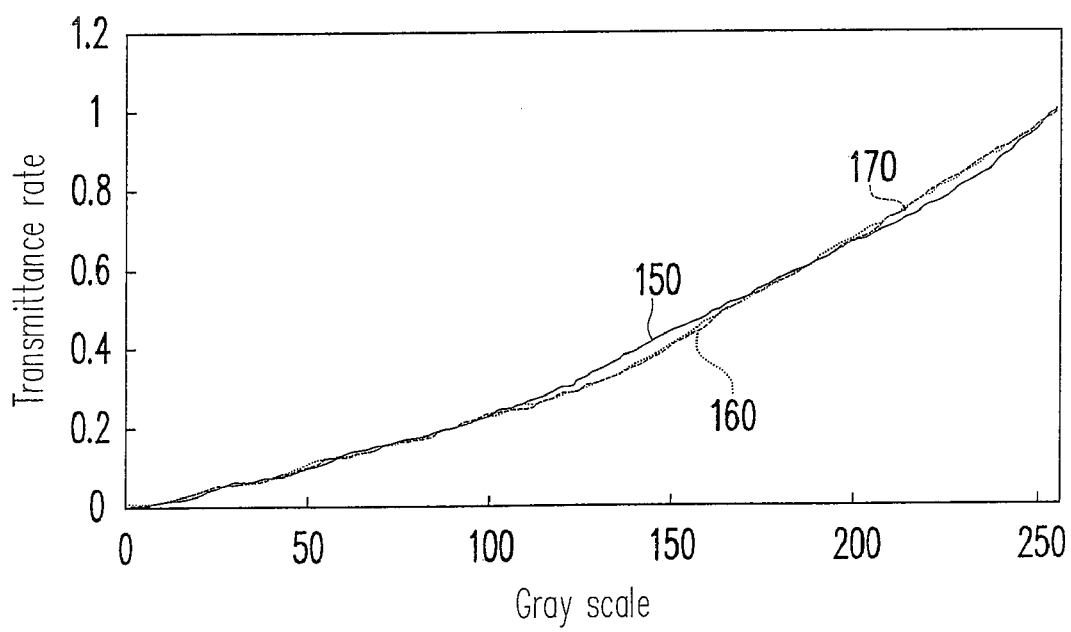
FIG. 1B is a gamma curve depicting a MVA LCD having the pixel structure 120.
Figure 2:
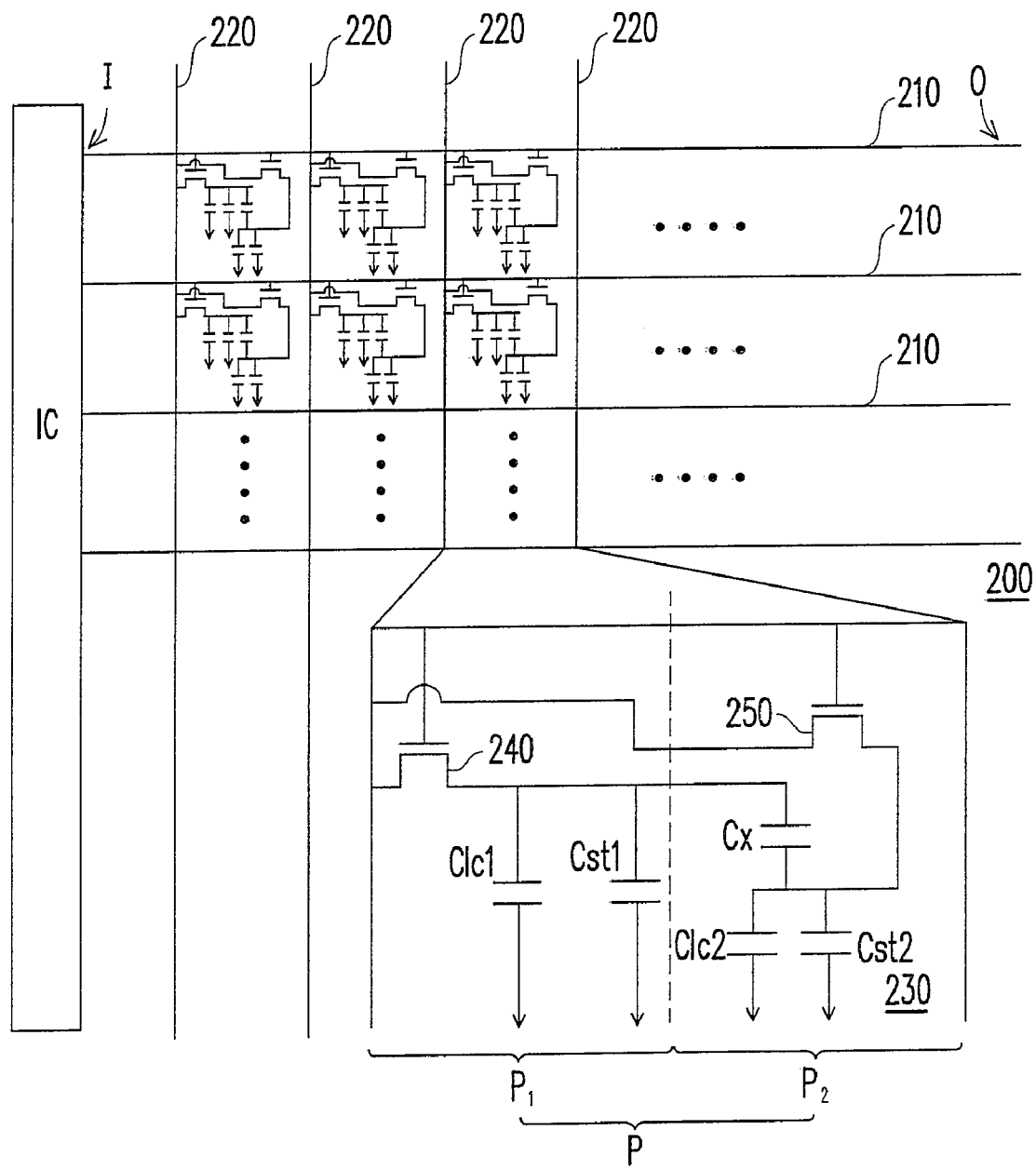
FIG. 2 is a schematic view of a TFT array substrate according to one embodiment of the present invention.

FIG. 2 is a schematic view of a TFT array substrate according to one embodiment of the present invention. Referring to FIG. 2, a TFT array substrate 200 includes a substrate (not shown), a plurality of scan lines 210, a plurality of data lines 220 and a plurality of pixel structures 230. The scan lines 210 are disposed on the substrate (not shown), and each scan line 210 includes a driving signal input terminal I and an end terminal O. In addition, the data lines 220 are disposed on the substrate (not shown), and a plurality of pixel areas P is defined by the scan lines 210 and the data lines 220 on the substrate (not shown). Each pixel area P includes a first sub-pixel area P1 and a second sub-pixel area P2.

The pixel structures 230 are respectively disposed in the pixel areas P and are driven by the scan lines 210 and the data lines 220. Each pixel structure 230 in the respective pixel area P includes a first TFT 240 corresponding to the first sub-pixel area P1 and a second TFT 250 corresponding to the second sub-pixel area P2. A channel width of each second TFT 250 is W (not shown) and a channel length of the same is L (not shown). Ratios W/L of the channel width to the channel length of the second TFTs 250 connected to the same scan line 210 increase gradually from the driving signal input terminal I to the end terminal O.

As applying to an LCD panel, the pixel structure 230 may further comprise a first liquid crystal capacitor Clc1, a second liquid crystal capacitor Clc2, and a coupling capacitor Cx. In addition, a first storage capacitor Cst1 and a second storage capacitor Cst2 may further disposed in the pixel structure 230 to prevent the voltage applied to liquid crystal molecules from dropping due to current leakage, so as to stabilize the voltage. The first liquid crystal capacitor Clc1 and the first storage capacitor Cst1 are, for example, disposed in the corresponding first sub-pixel area P1 and electrically connected to the corresponding first TFT 240 so as to provide a display voltage under the control of the first TFT 240. The second liquid crystal capacitor Clc2 and the second storage capacitor Cst2 are, for example, disposed in the corresponding second sub-pixel area P2 and electrically connected to the corresponding second TFT 250 so as to provide the display voltage under the control of the second TFT 250. In addition, the coupling capacitor Cx is, for example, electrically connected between the corresponding second liquid crystal capacitor Clc2 and the first TFT 240, such that the display voltage written into the first liquid crystal capacitor Clc1 and the first storage capacitor Cst1 and the display voltage written into the second liquid crystal capacitor Clc2 and the second storage capacitor Cst2 are different, and thereby color distortion and insufficient color saturation are compensated.

In the TFT array substrate 200, the arrangement of the second TFT 250 and the coupling capacitor Cx creates more domains in the liquid crystal layer in the same pixel area P in multi-domains, leading to an improvement in the wide-viewing-angle performance. In addition, the ratios W/L of the channel width to the channel length of the second TFTs 250 can be modified to adjust the charging/discharging capacities of the second TFTs 250 on the same scan line. In detail, the ratios W/L of the channel width to the channel length of the second TFTs 250 disposed on the same scan line 210 increase gradually from the driving signal input terminal I to the end terminal O. Thereby, the RC delay of the TFT array substrate 200 can be significantly reduced. Specifically, the TFT array substrate 200 provided by the present invention performs a superior display function.

Figure 3:
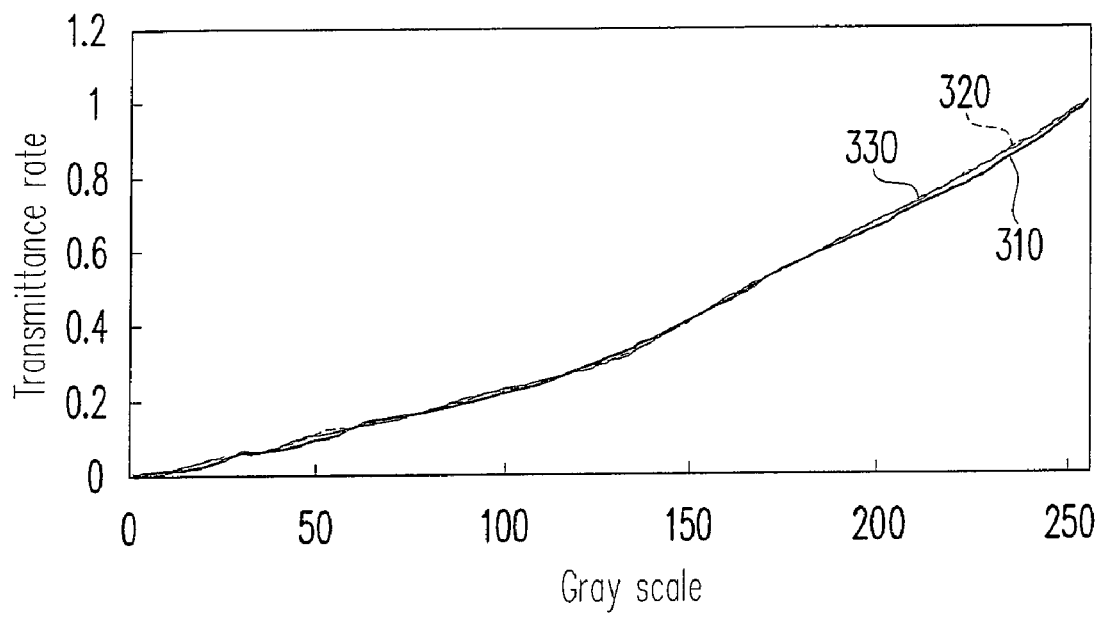
FIG. 3 is a gamma curve depicting an actual simulation of applying the TFT array substrate of FIG. 2 to an LCD.

FIG. 3 is a gamma curve depicting an actual simulation of applying the TFT array substrate 200 to an LCD. Here, curve 310 represents the gamma curve in the section close to the driving signal input terminal when viewing images on the LCD at a wide viewing angle. Curve 320 represents the gamma curve in the center section and curve 330 represents the gamma curve in the section far away from the driving signal input terminal when viewing the images on the LCD at the wide viewing angle. According to the simulated results in FIG. 3, the curves 310, 320 and 330 are almost overlapped with the others. In other words, even though the LCD of the TFT array substrate 200 is in various gray scale states, the light transmittance rates in different sections are nearly identical when viewing images on the LCD at the wide viewing angle. To be more specific, the application of the TFT array substrate 200 to the LCD uniformizes the display quality at different viewing angles, and thus color distortion or insufficient color saturation do not occur.

The channel width W can be reduced so as to decrease the ratios W/L of the second TFTs close to the driving signal input terminal. Since the channel width W can be merely reduced to a certain degree, the channel length L ought to be alternatively increased correspondingly.

Figure 4A:
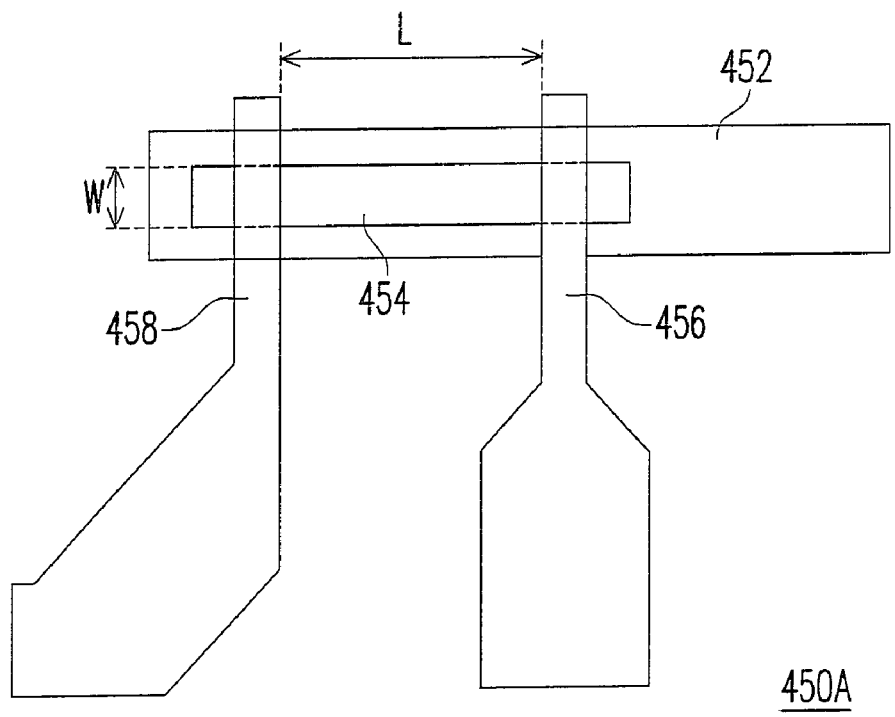
FIG. 4A is a schematic view depicting a second TFT having an extended channel length.

FIG. 4A is a schematic view depicting a second TFT having an extended channel length. A second TFT 450A includes a gate 452, a channel layer 454, a source 456 and a drain 458. The channel layer 454 is, for example, disposed on the gate 452, and the source 456 and the drain 458 are disposed on the channel layer 454 and cross over the corresponding gate 452, for example. Here, the channel width of the second TFT 450A, i.e. a width of the channel layer 454 between the source 456 and the drain 458, is W. The channel length of the second TFT 450A, i.e. a length of the channel layer 454 between the source 456 and the drain 458, is L. To compensate the RC delay, the channel length L of the second TFT 450a is directly increased, and the ratio W/L is then decreased. Thereby, even though the RC delay is reduced, the size of the second TFT 450A is enlarged and thus the aperture ratio of the LCD panel is affected.

Figure 4B:
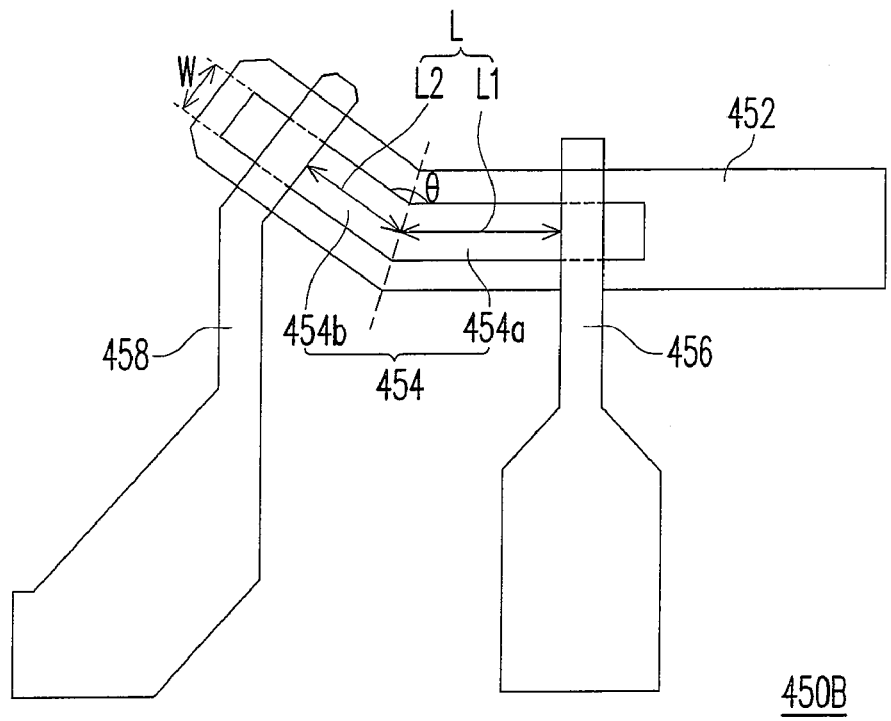
FIGS. 4B and 4C are schematic views depicting two kinds of the second TFTs according to one embodiment of the present invention.
Figure 4C:
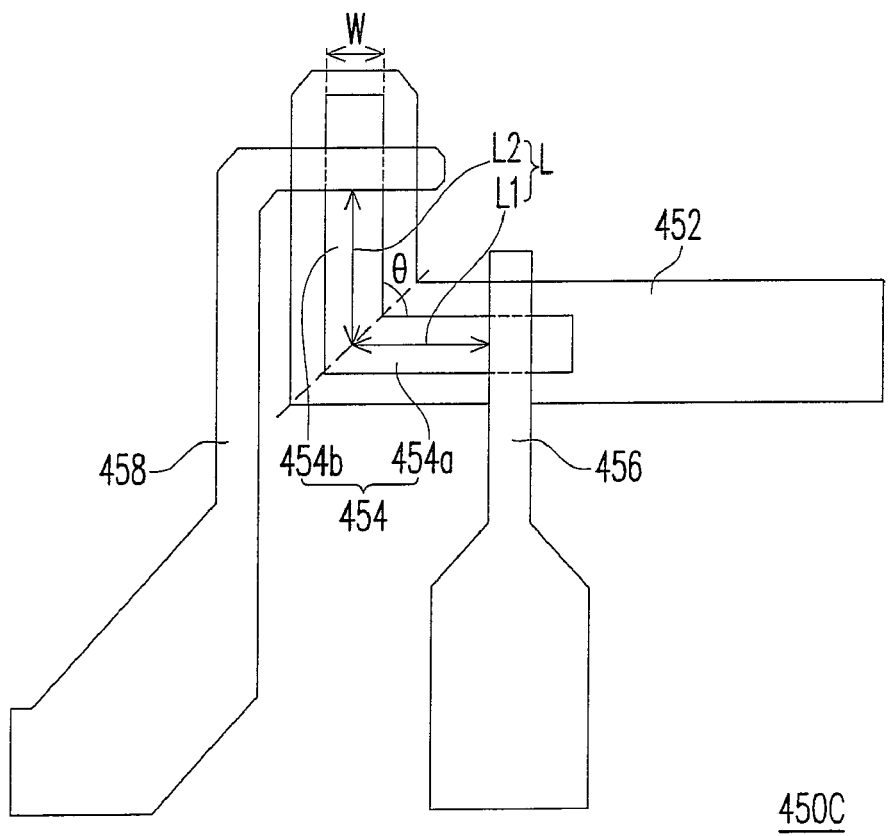

In view of the foregoing, the present invention provides a TFT structure to extend the channel length L through changing a shape of the channel layer in the absence of affecting the aperture ratio of the LCD panel. Particularly, as shown in FIGS. 4B and 4C, the second TFTs 450B and 450C respectively include a gate 452, a channel layer 454, a source 456 and a drain 458. The channel layer 454 is, for example, disposed on the gate 452 and includes a first section 454a and a second section 454b. The first section 454a and the second section 454b form an included angle θ. In addition, the source 456 and the drain 458 are disposed on the first section 454a and on the second section 454b of the channel layer 454, respectively.

The channel width of the second TFTs 450B and 450C, i.e. the width of the channel layer 454 between the source 456 and the drain 458 is W. The channel length of the second TFTs 450B and 450C, i.e. a length of the channel layer 454 between the source 456 and the drain 458 is L, wherein the channel length L is the sum of a length L1 of the first section 454a and a length L2 of the second section 454b between the source 456 and the drain 458. Besides, as shown in FIGS. 4B and 4C, the respective included angles θ formed by the first section 454a and the second section 454b of the channel layer 454 in the second TFT 450B and in the second TFT 450C are 135° and 90°, for example. According to other embodiments, the range of the included angle θ formed by the first section 454a and the second section 454b is $90° \leq \theta < 180°$, for example.

Next, please refer to FIGS. 4A, 4B and 4C simultaneously. Providing that the total channel length L of the second TFT 450B (i.e. sum of the length L1 of the first section 454a and the length L2 of the second section 454b between the source 456 and the drain 458) is equal to the channel length L of the second TFT 450A, it is known from the figures that the area occupied by the second TFT 450B is less than that occupied by the second TFT 450A. And the second TFT 450C occupies the least area in comparison with the second TFTs 450A and 450B. Accordingly, the designs of the second TFTs (450B and 450C) disclosed in the present invention guarantee a certain length of the channel layer 454 within a relatively small area.

Figure 4D:
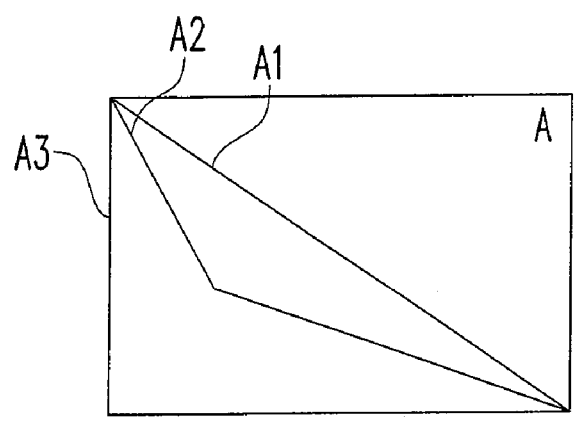
FIG. 4D depicts a range of a fixed area of a second TFT to be configured.

In other words, referring to FIG. 4D, given that the first and the second sections of the channel layer in the second TFTs are intended to be set within a fixed area A, the designs of the second TFTs can be shown as line segments A1, A2 and A3.

Here, the length correlation of the line segments is A3>A2>A1. In brief, through modulations on the lengths L1 and L2 of the first and the second sections and on the included angle θ, the designs of the second TFTs of the present invention enable an extension or a reduction of the channel length without changing the area of the TFTs. Thereby, not only the RC delay of the TFT is compensated, but also the aperture ratio of the LCD is not affected. That is to say, the charging/discharging capacity of each second TFT 450 on the same scan line can be adjusted without decreasing the aperture ratio of the LCD.

Figure 5:
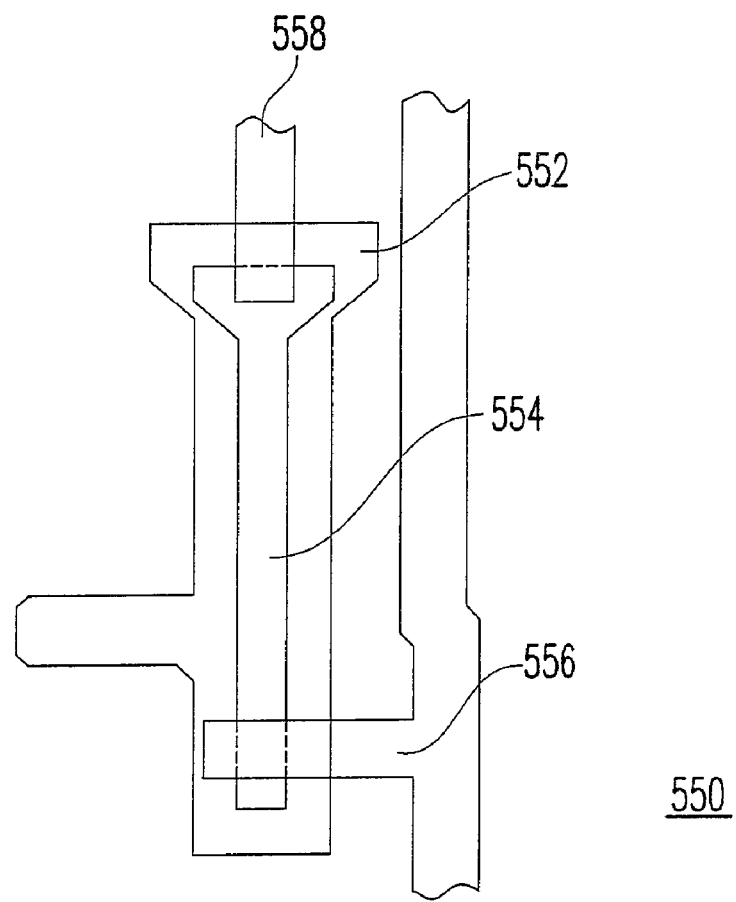
FIG. 5 is a schematic view depicting a second TFT.

On the other hand, there are inevitably a few alignment errors during the process of manufacturing the TFT array substrate, such that misalignment of film layer patterns may occur. According to the second TFT structure illustrated in FIG. 5, the alignment errors between a gate layer and a source/drain layer may result in variations in parasitic capacitance. The value of the parasitic capacitance between the gate 552 and the source 556 (or the drain 558) is proportional to the area of the overlapping section, and the value gives rise to an influence on a feed through voltage generated when a TFT 550 is turned off instantly. Thus, the inconsistent value of the parasitic capacitance between the gate 552 and the source 556 (or the drain 558) on the same scan line alters the feed through voltage and thus leads to undesirable luminance uniformity of the display.

To resolve the aforementioned problem, as shown in FIGS. 4B and 4C, the present invention provides that at least one of the source 456 and the drain 458 crosses over the gate 452 for self-compensation of the process errors. In more details, given that the misalignment of the source 456 or the drain 458 occurs due to the alignment errors in the manufacturing process, the area of the overlapping section between the source 456 (or the drain 458) and the gate 452 remains unchanged. Thereby, the parasitic capacitance generated between the source 456 (or the drain 458) and the gate 452 is maintained at a constant value, and the electrical properties of the second TFT 450 are not affected.

Figure 6:
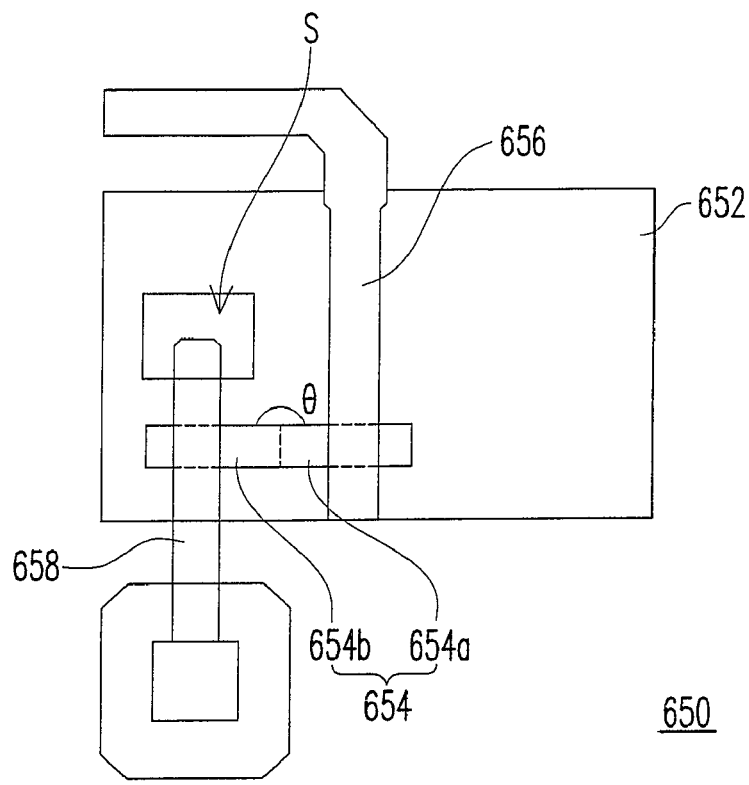
FIG. 6 is a schematic top view depicting another second TFT according to another embodiment of the present invention.

It is certain that the design of the second TFTs 450B or 450C can be individually applied to the TFT array substrate without utilizing the design of different second TFTs having various ratios W/L on the same scan line. As stated above, the design of the second TFT 450 permits a self compensation of the parasitic capacitance generated between the source 456 (or the drain 458) and the gate 452. Thus, when the design of the second TFT 450 is applied to the TFT array substrate, superior electrical properties thereof can be achieved In addition to said design, the present invention is capable of realizing the same self-compensation of parasitic capacitance through other designs. FIG. 6 is a schematic top view depicting another second TFT according to another embodiment of the present invention. Referring to FIG. 6, a second TFT 650 includes a gate 652, a channel layer 654, a source 656 and a drain 658. The channel layer 654 disposed on the gate 652 includes a first section 654a and a second section 654b together forming an included angle θ. The source 656 and the drain 658 are, for example, disposed on the first section 654a and on the second section 654b of the channel layer 654, respectively. The gate 652 has an opening S, and one terminal of the corresponding drain 658 is located in the opening S. Thus, since one terminal of the drain 658 is situated in the opening S, the area of the overlapping section between the drain 658 and the gate 652 remains unchanged and the parasitic capacitance between the drain 458 and the gate 452 is almost identical even though the drain 658 is formed and then shifted due to misalignment. In other words, the design of the second TFT 650 allows a self compensation of the parasitic capacitance generated between the drain 658 and the gate 652. According to other embodiments, it is also likely to form an identical opening on the gate 652 below the source 656 for the same performance.

Figure 7:
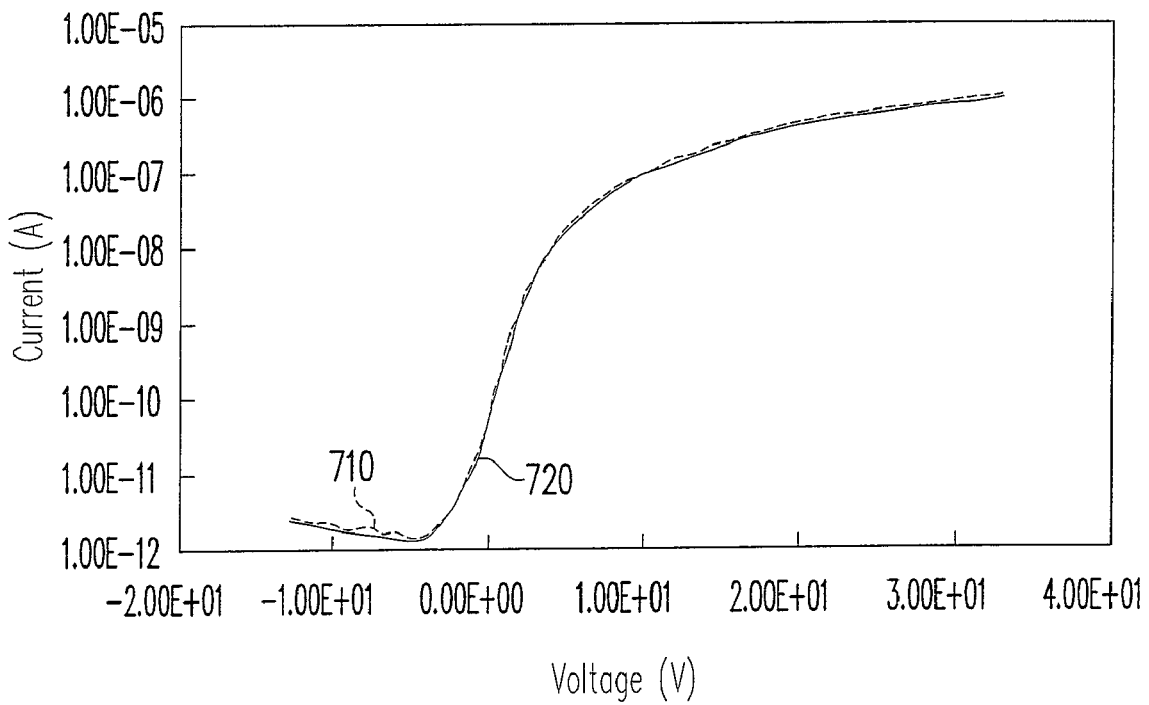
FIG. 7 depicts two curves representing the characteristics of the voltage and the current of a second TFT in the present invention and those of a conventional second TFT.

FIG. 7 depicts two curves respectively representing the characteristics of the voltage and the current of a second TFT in the present invention and in prior art, which proves that the properties of the second TFTs of the present invention are not altered by the geometric variation of the channel layer. The curve 710 denotes the characteristics of the voltage and the current of the second TFT in the present invention, while the curve 720 refers to the characteristics of the voltage and the current of the conventional second TFT. It is observed from FIG. 7 that the electrical properties of the two TFTs are almost the same. Namely, the second TFT of the present invention promotes the display efficiency of the LCD and also preserves the original electrical properties.

In summary, the TFT array substrate and the pixel structure of the present invention include at least the following advantages:

1. In the TFT array substrate and the pixel structure of the present invention, the liquid crystal molecules may have a variety of tilt directions because of the arrangement of the second TFT, such that the wide-viewing-angle performance is achieved, and the color distortion and insufficient color saturation (color washout) at various viewing angles are reduced as well.

2. On the premise that the aperture ratio of the display panel is not affected, the ratio W/L of the channel layer in the second TFT can be changed according to the TFT array substrate and the pixel structure of the present invention, so as to decrease the RC delay and to better the display performance of the LCD.

3. With various geometric designs of the second TFTs in the TFT array substrate and the pixel structure of the present invention, the parasitic capacitance induced between the gate and the source (or the drain) may be compensated, such that the display quality of the LCD can be further enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A thin film transistor (TFT) array substrate, comprising:
a substrate;
a plurality of scan lines disposed on the substrate, each scan line comprising a driving signal input terminal and an end terminal;
a plurality of data lines disposed on the substrate, a plurality of pixel areas being defined by the scan lines and the data lines on the substrate, wherein each pixel area comprises a first sub-pixel area and a second sub-pixel area; and
a plurality of pixel structures respectively disposed in the pixel areas and driven by the scan lines and the data lines, wherein each pixel structure in the respective pixel area comprises a first TFT corresponding to the first sub-pixel area and a second TFT corresponding to the second sub-pixel area, each second TFT comprises a channel layer, wherein the channel layer comprises a first section and a second section, the first section and the second section form an included angle θ, and included angles θ of the second TFTs connected to the same scan line increase from the driving signal input terminal the end terminal.

2. The TFT array substrate of claim 1, wherein a range of the included angle θ is 90°≦θ≦180°.

3. The TFT array substrate of claim 1, wherein a channel width of each second TFT is W and a channel length of the same is L, and ratios W/L of the channel width to the channel length of the second TFTs close to the driving signal input terminal are smaller than those of the second TFTs close to the end terminal of the same scan line.

4. The TFT array substrate of claim 1, wherein each second TFT further comprises:

a gate, wherein the channel layer is disposed on the gate; and a source and a drain disposed on the first section and on the second section of the channel layer, respectively.

5. The TFT array substrate of claim 4, wherein at least one of the source and the drain crosses over the corresponding gate.

6. The TFT array substrate of claim 4, wherein the gate has an opening, and one terminal of the source or one terminal of the drain corresponding to the pixel is located in the opening.

* * * * *